Feb. 24, 1970 — A. W. KAMMERER, JR — 3,497,020
SYSTEM FOR REDUCING HYDROSTATIC PRESSURE ON FORMATIONS
Filed May 20, 1968 — 2 Sheets-Sheet 1

INVENTOR.
ARCHER W. KAMMERER, JR.
By Bernard Kriegel
ATTORNEY.

Feb. 24, 1970

A. W. KAMMERER, JR 3,497,020

SYSTEM FOR REDUCING HYDROSTATIC PRESSURE ON FORMATIONS

Filed May 20, 1968

INVENTOR.
ARCHER W. KAMMERER, JR.
By Bernard Kriegel
ATTORNEY.

United States Patent Office 3,497,020
Patented Feb. 24, 1970

3,497,020
SYSTEM FOR REDUCING HYDROSTATIC
PRESSURE ON FORMATIONS
Archer W. Kammerer, Jr., 1900 Yucca Ave.,
Fullerton, Calif. 92632
Filed May 20, 1968, Ser. No. 730,219
Int. Cl. E21b 21/04
U.S. Cl. 175—69                                   10 Claims

ABSTRACT OF THE DISCLOSURE

A system for and method of reducing the hydrostatic pressure of drilling fluid acting on subsurface earth formations during the drilling of a well, in which air or other gas is admitted to the return stream of drilling fluid to lighten the same. Such a system in which air is admitted to the casing annulus to lighten fluid returning to the surface in the annulus. Such a system in which the drilling fluid passes through a cross-over and flows down the casing and well bore annulus and into the drill pipe during a portion of its travel.

---

Figure 1A:
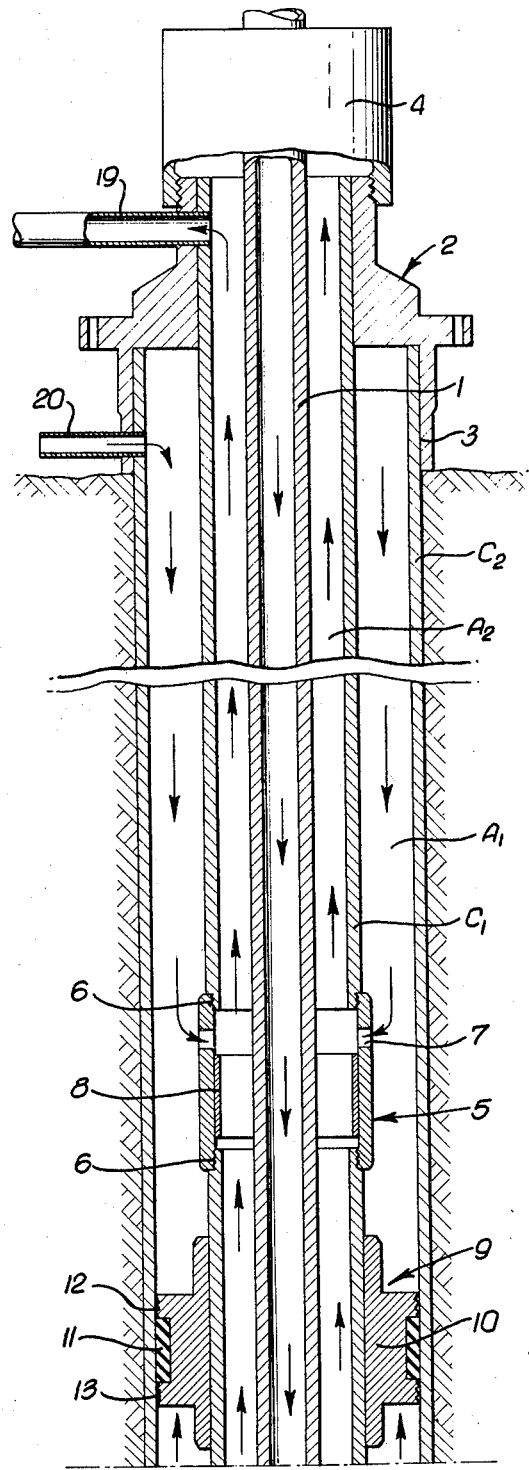

In the drilling of wells, such as oil and gas wells, into or through subterranean earth formations, the hydrostatic pressure of drilling fluid acting on the open well wall sometimes poses problems. Such problems may include the intrusion of the drilling fluid into the formation resulting in its contamination as well as in the development of an impermeable body of solid materials at or near the well bore wall which resist the return flow of well production fluids into the well bore following completion of the well. Such problems may also include the inability of the formation to sustain the pressure imposed thereon by the drilling fluid, resulting in breakdown of the formation structure, potentially with resultant loss of large quantities of drilling fluid into the formation.

Nevertheless, it is the practice in drilling wells, when using drilling mud as a vehicle for removing cuttings from the bottom of the hole, to weight the drilling mud with weighing materials whereby the hydrostatic pressure is at least sufficient to contain the formation pressure so as to prevent the well from blowing out, thus resulting in the application of the pressure of higher density drilling fluids on the formation. In any event, the use of drilling mud imposes on the formation a hydrostatic pressure which is a function of the depth of the well and the density of the fluid involved. If the pressure required to move the return of drilling fluid from the well is reduced, then, of course, the pressure acting on the formation during the drilling operation will be correspondingly reduced.

The present invention provides a system and method which reduces the drilling mud pressure on the formation, since the drilling operations, air or other gas, herein generally referred to as air, is introduced into the return flow of drilling mud so as to aerate the same, thereby reducing the density of the drilling mud. In addition to aeration of the drilling fluid, the air is supplied under pressure so as to tend to lift the drilling fluid and the cuttings entrained therein.

More specifically, the invention provides apparatus in which, for example, a length of casing is set in the well bore down to a certain depth, and therebelow a further length of smaller casing is set, the open bore hole extending downwardly below the smaller casing, and wherein a seal or barrier is provided between the larger casing and the outside of the smaller casing, air under pressure being admitted to the annular space between the casings and passing into the annular space between the smaller casing and the drill pipe, through which annular space, in the normal manner of mud circulation, the mud returns and cuttings flow to the surface of the well. The air passing into the returning stream of mud serves to aerate the same, thereby reducing its density and facilitating its continued flow to the top of the well.

On the other hand, cross-over means may be provided in the drill pipe string, so that during at least a portion of the path of travel of the drilling fluid, it flows in a course known as "reverse circulation"; that is, a course downwardly outside of the drill pipe through the open hole and upwardly through the drill bit and through the drill string to an upper location, at which it crosses into the annulus formed by the smaller casing and the drill pipe; and in this annulus between the smaller casing and the drill pipe, air is admitted from the larger casing to reduce the density of the returning drilling fluid.

This invention possesses many other advantages and has other purposes which may be made more clearly apparent from a consideration of a form and method embodying the invention. This form and method are shown and described in the present specification and in the drawings accompanying and constituting a part thereof. They will now be described in detail, for the purpose of illustrating the general principles of the invention; but it is to be understood that such detailed description is not to be taken in a limiting sense, since the scope of the invention is best defined by the appended claims.

Figure 1B:
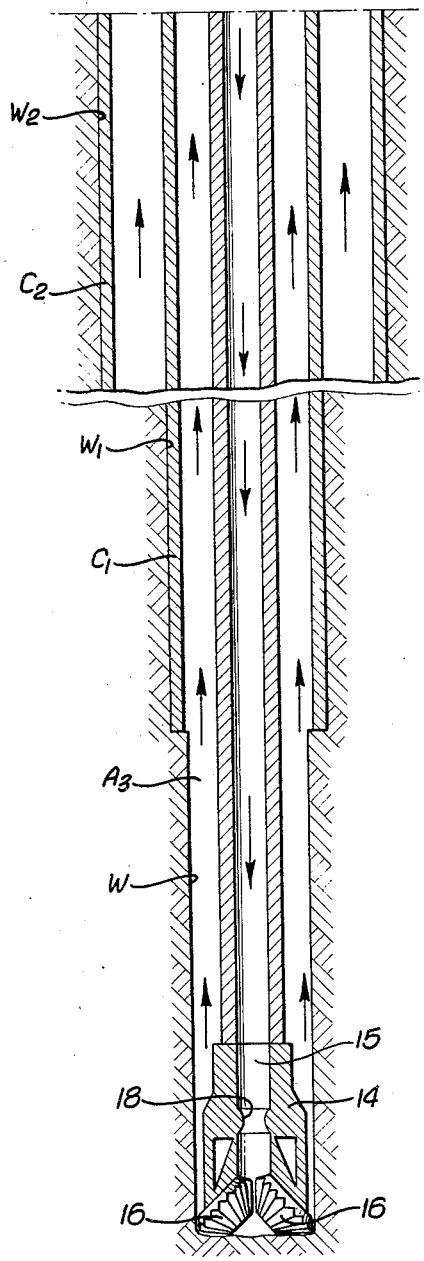
Figure 2A:
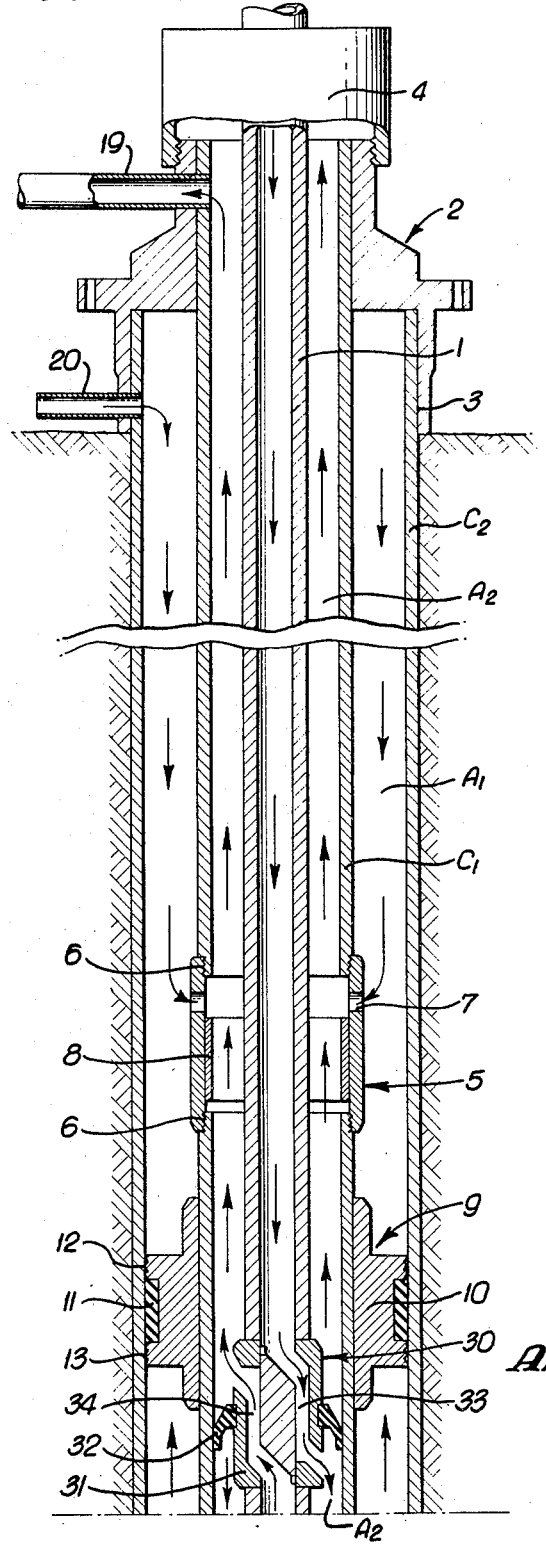
Figure 2B:
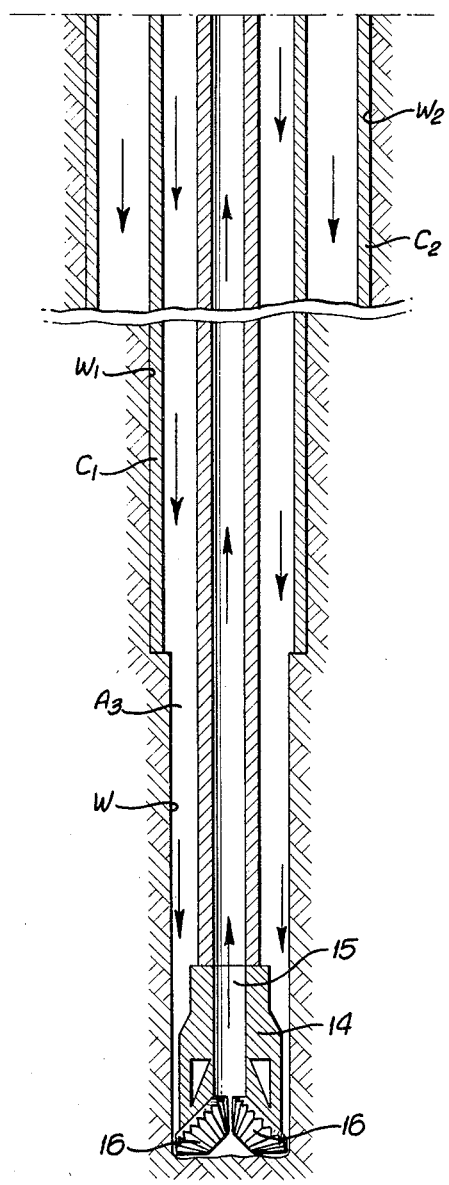

Referring to the drawings:

FIGURES 1a and 1b together constitute a view in vertical section illustrating a well drilling system in accordance with the invention; and FIGS. 2a and 2b together constitute a view in vertical section illustrating a modified system for reverse circulation.

Referring first to FIGS. 1a and 1b, there is illustrated a well drilling system involving a string of drill pipe 1 extending downwardly into the open well bore W through a string of inner casing C1 which has been set in an intermediate well bore section W1, there being above the casing C1 a second string of larger casing C2 set in a larger well bore W2. Suitable well head equipment, generally denoted at 2, is connected, as at 3, to the upper end of the casing C2 and the well head equipment may also include blowout preventer means 4, the details of which are not germane to the present invention.

Spaced downwardly from the top of the well in the string of casing C1 is port collar means, generally denoted at 5, which is made up in the casing string by threaded connections 6, 6, and which includes lateral ports 7 leading between the annular space A1, between the outer string of casing C2 and the inner string of casing C1, and the annular space A2, between the drill pipe 1 and the inner string of casing C1. The port collar 5 may also include sleeve valve 8 of known construction, which, in a suitable manner, may be moved between the position illustrated in FIG. 1a and an upper position across the ports at which the ports 7 will be closed. The details of such port collars are well known, and need not be more specifically illustrated nor described.

Suitable casing packer means, generally denoted at 9, are provided on the inner casing string C1 below the port collar 5, such a packer being well known in the art, which normally includes a body 10 having a packing element of rubber 11 thereon adapted to be deformed into tight sealing engagement with the inside wall of the outer casing C2 when the packer 9 is set and anchored therein by upwardly holding slips 12 and downwardly holding slips 13. Here again, the details of the particular casing packer mechanism are not germane to the invention. An example of a suitable packer useful in the system hereof is shown in United States Letters Patent No. 2,467,801.

At the lower end of the string of drill pipe 1 is illustrated a typical roller bit 14 secured to the pipe and having a central opening 15 therethrough and suitable roller cones or bit elements 16 revolvable in response to their engagement with the bottom 17 of the well bore as the drill string 1 is rotated. Such bits normally are provided with jet or nozzle openings in the region of the roller elements 16, whereby the drilling fluid is jetted into the bottom of the well bore at high velocity in order to assist in washing cuttings from the bit and hole bottom upwardly in the annular space A3 defined between the lower end of the drill string and the open well bore W. For illustrative purposes, however, a single restriction is illustrated at 18 in the central opening 15 through the bit, such restriction causing high velocity flow of drilling fluid through the bit, and, of course, creating a back pressure on the column of drilling fluid passing downwardly through the drill pipe 1 in the direction of the arrows shown therein.

Again referring to the well head equipment, a mud return pipe or conduit 19 is illustrated, which communicates with the annular space A2 between the inner casing C1 and the drill pipe 1 at the top of the hole. Thus, it will be understood from the arrows illustrative of the course of flow of drilling fluid that drilling fluid entering the drill pipe 1 flows downwardly therethrough, passing from the drill bit, and then flows upwardly through the annular space A3 into the annular space A2, from whence it flows through the mud pipe 19 to a suitable mud pit (not shown).

Such fluid flow is the normal flow of drilling mud during well drilling operations. The pressure applied to the well wall W in the open hole during the drilling operation is effectively the pressure required to lift the column of drilling fluid through the annular space A3 and the annular space A2 to displace the same from the top of the well. This is true, notwithstanding the existence of the column of fluid in the drill pipe 1 which must be displaced by the mud pumps at greater pressure in order to force the fluid downwardly through the more restricted drill pipe and through the typical restrictions in the jet bit. Accordingly, in deeper wells, or in wells in which the formation at the well bore W is incompetent, the pressure acting on the formation may be substantial and in excess of that which the formation can support without breakdown. On the other hand, if the formation is porous and tends to allow intrusion of the drilling fluid, then large losses of drilling fluid may result, as well as the formation of undesirably heavy filter cake along the wall of the well bore W, all of which will interfere with ultimate freedom of flow of well formation fluids back into the well when the well has been completed. The present system and method obviate the problem of excessive fluid pressure on the exposed formation in the well bore W by aerating a portion of the fluid column in the annular spaces A2 and A3. This is accomplished by introducing air through an air inlet 20 at the well head, this air, as shown by the arrows, passing downwardly through the annular space A1 between the outer casing C2 and the inner casing C1, and then entering inner annular space A2 through the port collar ports 7, where the air commingles with the drilling mud, areating the same and tending to assist the further upward flow of the mud to the conduit 19. The effect of the air on the portion of the column of returning drilling mud between the port collar 5 and the top of the well is to reduce the density of the drilling mud, thereby reducing the pressure on the formation in the well bore W by reducing the pressure necessary to effect the upward flow of the entire returning fluid column. In addition, the air is supplied at a pressure and volume as to assist in promoting flow of the aerated mud. By way of examples, the ported collar may be located 1,000, 2,000, 3,000, etc. feet below the top of the hole, the aeration of the fluent column above the ports resulting in a considerable reduction in the fluid pressure acting on the wall W of the open hole.

Referring to FIGS. 2a and 2b, the system is illustrated as being adapted for circulating in a reverse manner, at least in the lower portion of the well. As in the case of the first-described system, the well head equipment is the same, and the larger string of casing C2 and the smaller string of casing C1 are respectively set in the well bores W2 and W1, the well bore W being open below the inner string of casing C1. Also in the example of FIGS. 2a and 2b, there is a port collar 5 of the type previously described, as well as a casing packer assembly 9, also of the type previously described.

In this construction, however, the bit 14 has an unrestricted central passage 15 therethrough, as is customary of the bits employed during reverse circulation techniques of well drilling.

In order to enable utilization of the reverse circulation technique in the deeper portion of the well drilling operation, a cross-over assembly, generally denoted at 30, is provided in the drill string 1. This cross-over assembly comprises a body 31 connected in the string of drill pipe 1 and having suitable sealing means 32, herein shown as a downwardly facing packer cup, projecting outwardly therefrom into slidable sealing engagement with the inner wall of the inner casing C1. Included in the cross-over assembly 30 is a passage 33 leading from the drill pipe 1 above the cross-over assembly to the exterior thereof below the sealing element 32. Thus, as shown by the arrows, drilling mud will pass downwardly through the drill pipe 1 to the cross-over assembly 30, and then, via the passage 33, will pass into the annular space A2. In the annular space A2 the drilling fluid passes downwardly into the well bore W in the annular space A3, continuing downwardly along the outside of the bit 14, and then upwardly through the bit passage 15 into the portion of the drill pipe 1 below the cross-over assembly 30. The cross-over assembly 30 has a second passage 34, which is the reverse of the previously described passage 33, and which is in communication with the drill pipe 1 below the cross-over assembly 30, and with the annular space A2 above the sealing means 32, so that, at the cross-over assembly 30, the returning drilling fluid flows into the annular space A2 and then upwardly to the mud pipe 19, as in the previously described embodiment.

Now, it will be apparent that air admitted through the air inlet 20 of FIG. 2a will pass downwardly through the annular space A1 into the port collar ports 7 where it will again commingle with the returning drilling fluid column, so as to aerate the same and assist its flow upwardly to the mud pipe 19. Here again, by virtue of the aeration of the returning column of drilling fluid, the pressure necessary to lift the returning column is reduced since the returning column has been reduced in its density at the upper portion thereof above the port collar 5 over an extended length, which, for example, may be several thousand feet in deep well bores.

I claim:

1. In a well drilling system: an outer casing extending into the well, an inner casing extending through said outer casing into the well, a drill string extending through said inner casing into the well bore, a drill bit at the lower end of said drill string, said outer casing and said inner casing defining a first annular space extending from the top of the well to the lower end of said outer casing, said inner casing and said drill string defining a second annular space extending from the top of the well to the lower end of said inner casing, said drill string defining with the well bore a third annular space, means at the top of the well for conducting therefrom the flow of drilling mud pumped into the upper end of said drill string and flowing to the bottom of the well through said drill bit and returning from said drill bit to the top of the well, packing means between said outer casing and said inner casing in said first annular space below the top of the well, port means in said inner casing above said seal means, and air inlet means at the top of the well for admitting air under pressure to said first annular space for causing said air to enter said second annular space through said port means to aerate the drilling mud in said second annular space above said port means and reduce the mud pressure on said well bore below said inner casing.

2. A well drilling system as defined in claim 1, wherein said port means includes closable port collar means in said inner casing.

3. A well drilling system as defined in claim 1, wherein said packing means comprises casing packer means carried by said inner casing and set in engagement with said outer casing.

4. A well drilling system as defined in claim 1, wherein said drill string includes cross-over means above said drill bit and having a seal engaged with said inner casing below said port means for conducting fluid flowing downwardly in said drill string into said second annulus below said seal and for conducting fluid flowing upwardly in said drill pipe into said second annulus above said seal.

5. A well drilling system as defined in claim 1, wherein said drill string includes cross-over means above said drill bit and having a seal engaged with said inner casing below said port means, said cross-over means including a passage leading between said drill string above said seal and said second annular space and another passage leading between said second annular space and said drill string below said seal.

6. A well drilling string as defined in claim 1, wherein said port means includes port collar means having a valve sleeve for closing said port means.

7. The method of reducing the pressure of fluid returns on the formation traversed by a well bore in which an outer casing and an inner casing are set, comprising: providing a seal between said inner and outer casings, providing a port in said inner casing above said seal, circulating fluid into the well through pipe extending into the well bore below said inner casing and from said well in the annulus between said pipe and the inner casing, and injecting air under pressure into said inner casing through said port to reduce the density of the fluid column in said second casing above said port.

8. The method of claim 7, wherein said fluid flows to the bottom of the well through said pipe and returns to the top of the well outside of said pipe.

9. The method of claim 7, including effecting the cross-over flow of said fluid below said port, by providing a cross-over in said pipe to cause the flow of fluid from above said cross-over into said inner casing outside of said pipe and to cause the return flow of fluid from below said cross-over into said pipe.

10. The method of claim 7, wherein said air is introduced at a rate to cause the lift of said fluid above said port.

References Cited

UNITED STATES PATENTS

| | | | |
|---|---|---|---|
| 2,543,382 | 2/1951 | Schabarum | 175—215 X |
| 2,641,444 | 6/1953 | Moon | 175—325 X |
| 2,726,063 | 12/1955 | Ragland et al. | 175—69 |
| 2,946,565 | 7/1960 | Williams | 175—325 X |
| 2,984,309 | 5/1961 | Welchon | 175—69 |
| 3,151,690 | 10/1964 | Grable | 175—215 X |
| 3,338,322 | 8/1967 | Henderson | 175—69 X |

DAVID H. BROWN, Primary Examiner

U.S. Cl. X.R.

175—212, 325